No. 706,367. Patented Aug. 5, 1902.
W. S. WASHBURN.
HARVESTER.
(Application filed Sept. 20, 1900.)
(No Model.)
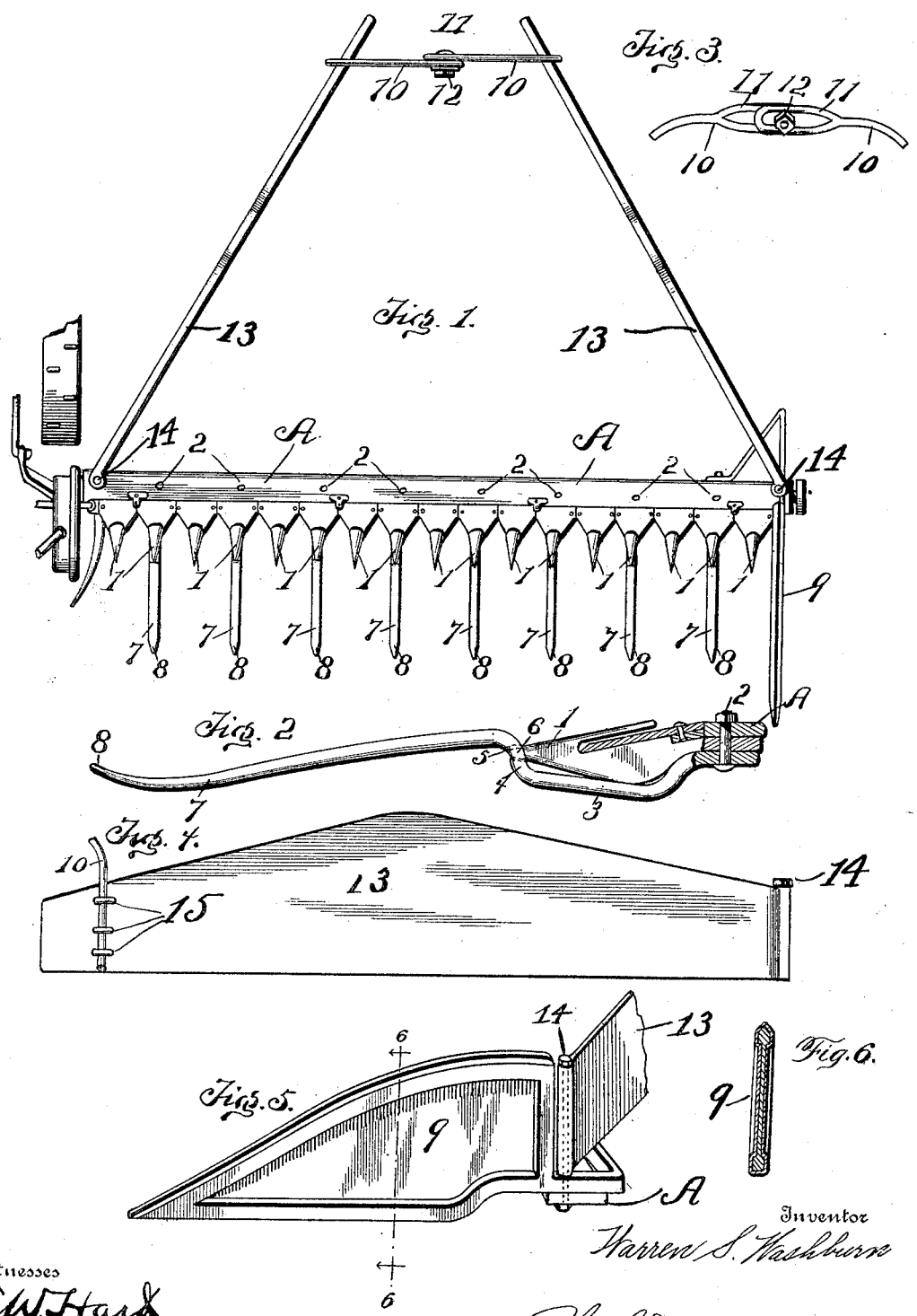

United States Patent Office.

WARREN S. WASHBURN, OF ADAMS CENTER, NEW YORK.

HARVESTER.

SPECIFICATION forming part of Letters Patent No. 706,367, dated August 5, 1902.

Application filed September 20, 1900. Serial No. 30,604. (No model.)

*To all whom it may concern:*

Be it known that I, WARREN S. WASHBURN, a citizen of the United States of America, residing at Adams Center, Jefferson county, State of New York, have invented a new and useful Improvement in Harvesters, of which the following is a specification.

My invention relates to an improvement in harvesters, and more particularly to what is termed a "pea-cutter," the object being to provide an attachment for mowing-machines which will adapt the machine to the cutting of pea-vines, whether long or short.

A further object is to provide a simple, inexpensive, durable, and efficient machine for accomplishing the work of cutting pea-vines and piling them in windrows.

With these objects in view my invention consists in certain novel features of construction and combinations of parts, which will be hereinafter more fully described, and particularly pointed out in the claims.

In the accompanying drawings, Figure 1 is a plan view of my invention. Fig. 2 is an enlarged detail showing the guard-finger, finger-bar, and connected parts. Fig. 3 is a detail of the adjustable fastening for the wings. Fig. 4 shows one of these wings. Fig. 5 is an enlarged perspective view of the divider, and Fig. 6 is a section on line 6 6 of Fig. 5 looking in the direction of the arrows.

A represents the finger-bar of a mowing-machine, and 1 1 the usual guard-fingers thereon.

A series of guards, as represented in Fig. 2, are employed in connection with the fingers to facilitate the operation of cutting peas, and these guards consist, preferably, of castings, substantially as shown, adapted to extend under the fingers and be secured at their inner ends by the same bolts which secure the fingers to the finger-bar, as indicated at 2. The portion 3, which conforms to and extends beneath the fingers, constitutes a runner which slides upon the ground with the motion of the machine. At the forward end this runner portion is bent upwardly to form a shoulder 4, and in this shoulder a hole 5 is provided to receive the point 6 of the finger. From the shoulder the guard extends forward in the form of a long slender tine 7, which preferably tapers slightly throughout the greater portion of its length and extends gradually downward to a plane level with the runner, and thence bends slightly upward, where it terminates in a point 8, adapted to find its way through the peas or other material being harvested. Thus it will be seen that these guards constitute an elongation of the fingers, and as many of them may be used as there are fingers on the finger-bar, or less, accordingly as they are required for cutting short or long vines. By reason of this construction it will be seen that the peas follow the guard until they reach the shoulder, whence they drop onto the knife, when they are cut by the reciprocating motion of the cutter-bar. By extending the guard beneath the finger it not only serves as a runner and an extension or elongation of the finger, but also is out of the way, and does not extend over the cutter-bar, so that the pea-vines passing over the guard must necessarily fall unobstructed into the path of the reciprocating knives, which would not be true if the guard extended over the finger instead of beneath it.

At the outer end of the finger-bar a triangular divider 9 is located. This divider is longer than the guards and parts the peas as they are cut from those left standing, leaving a clean space next to the standing peas. The advantage of this arrangement is that the divider precedes the guards and straightens up the peas for the next circuit of the machine. This divider may be made of any suitable material and covered with steel sheeting and is preferably fastened with one bolt and clipped on the end beyond the cutter-bar.

In addition to the parts described means are provided for accumulating the cut peas in windrows, and this means consists of a pair of wings 13 13, each of which is hinged or pivoted at each extreme end of the finger-bar by means of bolts 14 14. These wings are preferably higher at their inner ends adjacent to the finger-bar than at their rear ends, and at intermediate points they are still higher than at the forward ends, the object of this arrangement being to adapt them for use in the cutting or harvesting of long pea-vines. These wings may be adjusted to make a wider or narrower windrow, as the case may be, and this adjustment is conveniently accomplished by means of the arms 10 10, which extend from the rear ends of the wings toward each other, arching over the space between the rear ends. These arms 10 10 are secured to the wings by means of staples 15, as seen in Fig. 4. The adjacent ends of these arms are provided with the elongated slots 11 11, which lie superimposed, and a bolt 12, passing through them, is adapted to hold the rear ends of the wings a greater or less distance apart, accordingly as they are adjusted for a wide or narrow windrow.

The wings are preferably the same length, and consequently adjusted alike at their rear ends, thus throwing the windrow back of the center of the cutter-bar, so that the windrow is straddled by the team in coming around upon the next circuit.

This machine has been put in operation and proved itself most efficient in the harvesting of peas, and it is evident that it might also be employed for the harvesting of other products of the soil as well.

Obviously slight changes might be made in the form and arrangement of the various parts described without departing from the spirit and scope of my invention, and hence I do not wish to limit myself to the exact construction herein set forth; but,

Having thus fully described my invention, what I claim as new, and desire to secure by Letters Patent, is as follows:

1. The combination with a finger-bar provided with fingers, of guards secured to the finger-bar and extending forwardly therefrom beyond the fingers, that portion of the guards in front of the fingers forming a downwardly-inclined prolongation of the fingers and terminating in a slight upward incline, without returning toward the finger-bar, the downwardly-inclined prolongation forming a runner resting upon the ground, and the rearward portion of the guards located beneath the fingers.

2. In a harvester, the combination with a finger-bar provided with fingers, of guards secured to the finger-bar and extending forwardly therefrom beyond the fingers, that portion of the guards in front of the fingers forming a downwardly-inclined prolongation of the fingers, and terminating in a slight upward incline without returning toward the finger-bar, the downwardly-inclined prolongation forming a runner at the extreme end to prevent contact of the point of the guard with the ground, and the rearward portion of the guards located beneath the fingers, the harvester provided also with a divider secured to the finger-bar and a pair of movable wings or windrowers extending rearwardly of the finger-bar to which they are pivoted.

3. The combination with a finger-bar provided with fingers, of a guard for the fingers, having a portion bent to conform to the lower surface of the fingers and constituting runners therefor, said guards having shoulders formed with an opening to receive the point of the finger and the forward terminating ends constituting an extension or elongation of the fingers, and the rear ends having a hole therein in alinement with the hole in the fingers and finger-bar, whereby the guard and finger are secured to the finger-bar by the same bolt, the rear ends of the guards and fingers terminating in approximately the same plane as the rear edge of the finger-bar.

4. The combination with a pair of wings pivoted or hinged at their forward ends adjacent to the opposite ends of the finger-bar of a harvester, of a pair of arms, one of which is connected with each wing at or near the rear end thereof, said arms formed into loops at their free ends and means connecting the ends whereby they can be secured adjustably together to regulate the space between the rear ends of the wings.

In testimony whereof I have signed my name to this specification in the presence of two subscribing witnesses.

WARREN S. WASHBURN.

Witnesses:
THOMAS F. SAUNDERS,
A. F. SAUNDERS.